(12) United States Patent
Reed

(10) Patent No.: US 12,734,974 B2
(45) Date of Patent: Sep. 15, 2026

(54) CARRIER FOR TRANSPORTATION

(71) Applicant: MRex LLC, Grand Junction, CO (US)

(72) Inventor: Michael Reed, Grand Junction, CO (US)

(73) Assignee: MRex LLC, Grand Junction, CO (US)

(*) Notice: Subject to any disclaimer, the term of this patent is extended or adjusted under 35 U.S.C. 154(b) by 55 days.

(21) Appl. No.: 18/517,415

(22) Filed: Nov. 22, 2023

(65) Prior Publication Data

US 2025/0162509 A1 May 22, 2025

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC ........................................................ B60R 9/06
USPC .......................................................... 224/519
See application file for complete search history.

(56) References Cited

U.S. PATENT DOCUMENTS 4,746,138 A * 5/1988 James ...................... B60D 1/50 280/487
5,333,888 A * 8/1994 Ball ......................... B60D 1/52 280/506
5,423,566 A * 6/1995 Warrington ............. B60D 1/52 224/532
5,988,667 A * 11/1999 Young .................... B60D 1/241 280/506
6,006,973 A * 12/1999 Belinky .................... B60R 9/10 224/500
6,202,909 B1 * 3/2001 Belinky .................... B60R 9/06 224/523
6,345,750 B1 * 2/2002 McCoy ..................... B60R 9/10 224/924
6,835,021 B1 * 12/2004 McMillan ............. B60D 1/155 280/506
7,448,640 B2 * 11/2008 Weaver .................... B60D 1/06 280/506
7,740,267 B2 * 6/2010 Kirtland ................... B60D 1/52 280/506
8,262,121 B2 * 9/2012 Beck ........................ B60D 1/52 280/506
8,419,041 B2 * 4/2013 Bessette ................... B60D 1/52 280/506
8,985,418 B1 * 3/2015 Poudrier ................... B60R 9/06 224/521
9,114,758 B1 * 8/2015 Poudrier ................... B62B 3/02
11,014,219 B2 * 5/2021 Sugarman ............... B25B 13/48
D986,120 S * 5/2023 Smith .......................... D12/162
11,772,569 B2 * 10/2023 Huang ...................... F16B 2/20 224/519
2017/0057310 A1 * 3/2017 Smith ...................... B60D 1/58

* cited by examiner

*Primary Examiner* — Nathan J Newhouse
*Assistant Examiner* — Lester L Vanterpool
(74) *Attorney, Agent, or Firm* — Reinhart Boerner Van Deuren s.c.

(57) ABSTRACT

A carrier is provided for transporting objects, such as two-wheeled vehicles via a transportation vehicle. The carrier includes a unique coupling mechanism such that movement between the carrier and the tow hitch of the transportation vehicle is greatly reduced, thereby providing a more secure platform upon which to transport the two-wheeled vehicles.

20 Claims, 4 Drawing Sheets

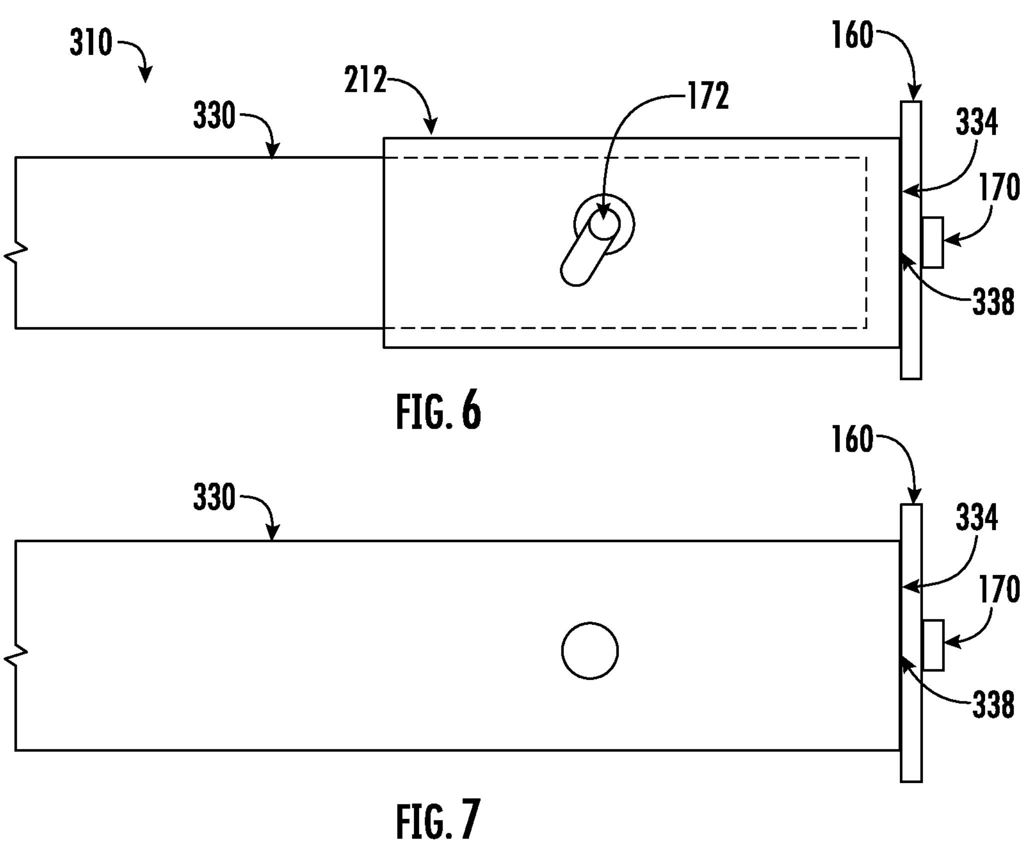
FIG. 6
FIG. 7
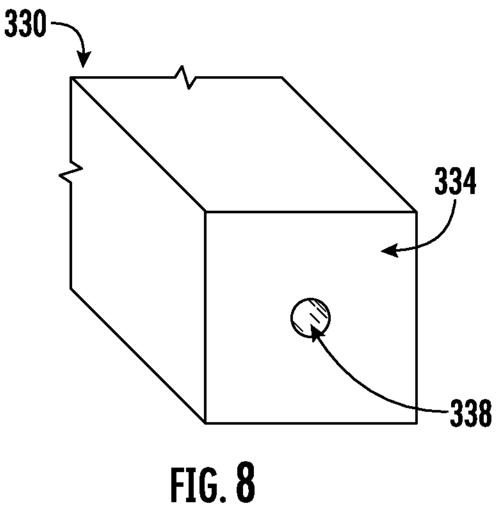
FIG. 8

CARRIER FOR TRANSPORTATION

BACKGROUND OF THE INVENTION

The present disclosure is directed generally to support devices for transportation. The present disclosure relates specifically to a trailer hitch for coupling to a vehicle for transporting objects, such as two-wheeled vehicles, such as bicycles.

SUMMARY OF THE INVENTION

One embodiment of the invention relates to a carrier, such as for motorcycles, bicycles, storage racks or storage boxes for detachably coupling to a vehicle. The carrier includes a primary support arm configured to extend through a tow hitch coupled to a towing vehicle, a coupling plate defining a first aperture, the coupling plate interfacing against the first end of the tow hitch, a fastener extending through the first aperture and into the first cavity, and a support platform configured to couple and support to one or more two-wheeled vehicles. The primary support arm extends along a first primary longitudinal axis from a first end to a second end. The support platform is coupled to the second end of the primary support arm. The primary support arm defines a first cavity at the first end extending along a second primary longitudinal axis parallel to the first primary longitudinal axis. The first cavity includes threading extending inward. The primary support arm defines a second cavity extending along a third primary longitudinal axis perpendicular to each of the first primary longitudinal axis and the second primary longitudinal axis. The fastener threadably engages the threading in the first cavity, and the engagement between the fastener and the primary support arm biasing the coupling plate against the first end of the tow hitch.

Another embodiment of the invention relates to a carrier for detachably coupling to a vehicle. The carrier includes a primary support arm configured to extend through a tow hitch coupled to a towing vehicle, a hitch pin extending through the second cavity and a first aperture in the tow hitch, a coupling plate defining a second aperture, a fastener extending through the second aperture, and a support platform configured to couple and support to one or more two-wheeled vehicles. The primary support arm extends along a first primary longitudinal axis from a first end to a second end. The support platform is coupled to the second end of the primary support arm. The primary support arm defines a first cavity at the first end extending along a second primary longitudinal axis parallel to the first primary longitudinal axis. The first cavity defines threading extending inward. The primary support arm defines a second cavity extending along a third primary longitudinal axis perpendicular to each of the first primary longitudinal axis and the second primary longitudinal axis. The fastener engages the primary support arm, the engagement between the fastener and the primary support arm biasing the coupling plate against the tow hitch.

An exemplary method of using this invention includes sliding a primary support arm through a tow hitch, the primary support arm extending along a first primary longitudinal axis from a first end to a second end. The primary support arm defines a first cavity at the first end extending along a second primary longitudinal axis parallel to the first primary longitudinal axis. The first cavity defines threading. The primary support arm defines a second cavity extending along a third primary longitudinal axis perpendicular to each of the first primary longitudinal axis and the second primary longitudinal axis. The method includes extending a hitch pin through the second cavity and a first aperture in the tow hitch, and extending a fastener through a first aperture of a coupling plate and into the first cavity, the fastener and the threading in the first cavity threadably engaging such that the coupling plate is biased against the tow hitch. The method includes securing one or more two-wheeled vehicles to a support platform coupled to the second end of the primary support arm.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 6 is a side view of a portion of a carrier, according to another exemplary embodiment.

FIG. 7 is a side view of a portion of the carrier of FIG. 6, according to another exemplary embodiment.

FIG. 8 is a rear view of a portion of the carrier of FIG. 6, according to another exemplary embodiment.

DETAILED DESCRIPTION

Referring generally to the figures, various embodiments of a carrier are shown. Described herein is a carrier to transport two-wheeled vehicles, such as bicycles and motorcycles, via a transportation vehicle, such as a car or truck. The carrier is coupled to the tow hitch of the transportation vehicle such that the carrier is permitted little to no movement and/or rotation relative to the tow hitch. As a result, the carrier remains more stable when the transportation vehicle is moving, such as at high speeds on a highway. In various embodiments, the carrier is biased forward via a coupling plate that couples to a front end of the tow hitch. That biasing, combined with the hitch pin reducing how far forward the carrier can be slid forward, result in a relatively secure coupling between the carrier and the transportation vehicle.

Figure 1:
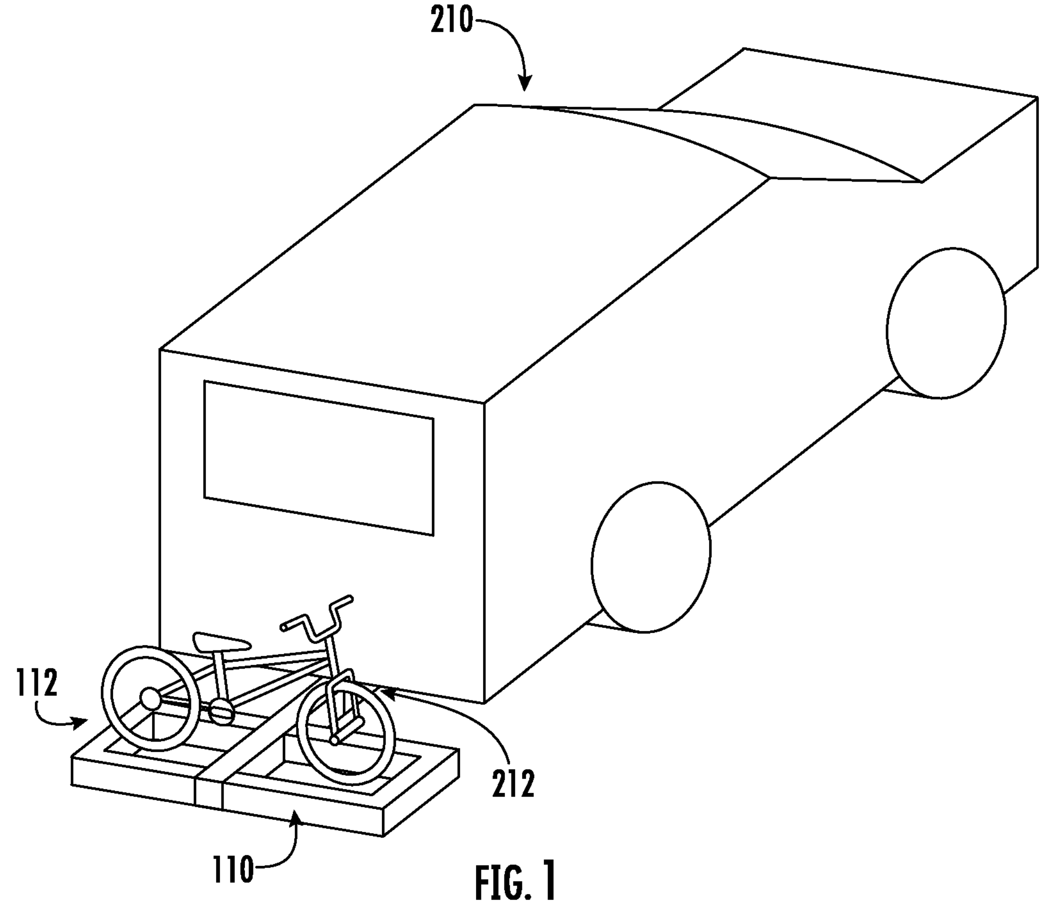
FIG. 1 is a perspective view of a carrier, according to an exemplary embodiment.
Figure 2:
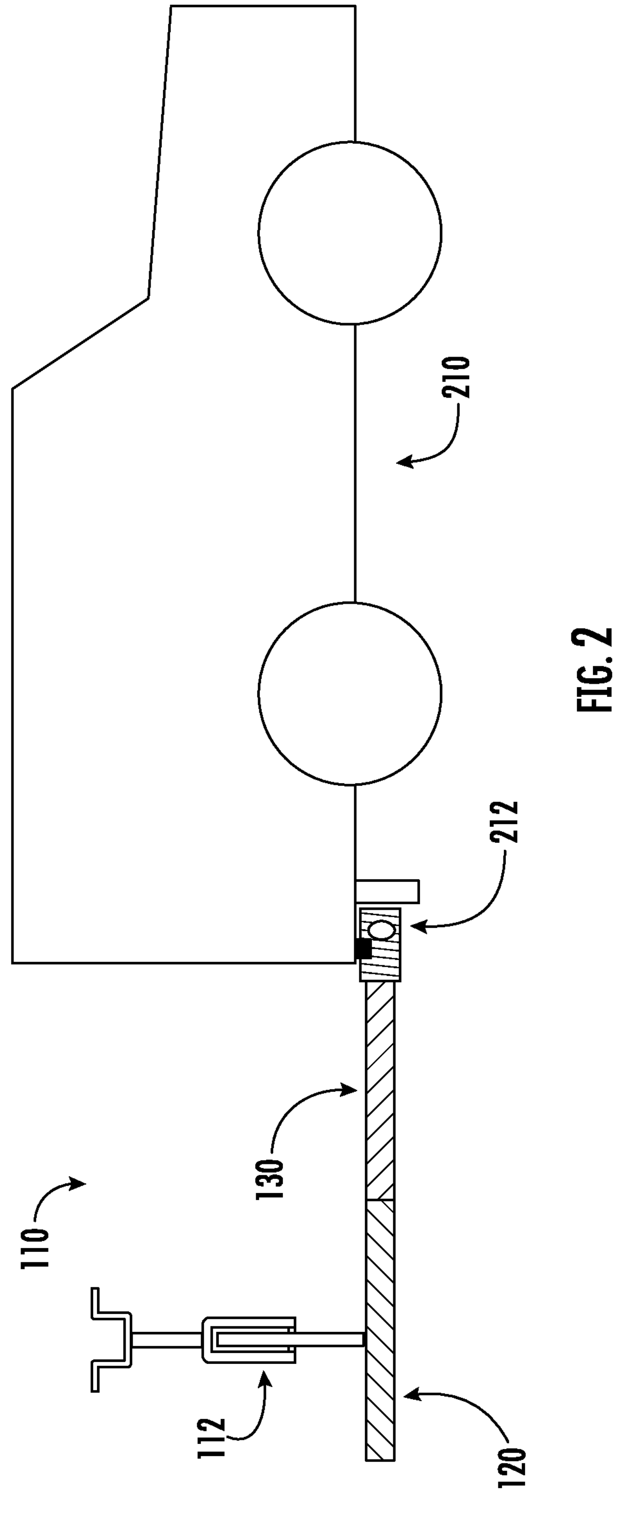
FIG. 2 is a side view of the carrier of FIG. 1, according to an exemplary embodiment.

Referring to FIGS. 1-2, a transportation device, shown as carrier 110, is shown according to an exemplary embodiment. In various embodiments, carrier 110 includes primary support arm 130, coupling plate 160, fastener 170, and support platform 120. Carrier 110 is configured to be coupled to a vehicle, shown as vehicle 210, such as via tow hitch 212 rigidly coupled to vehicle 210. In particular, primary support arm 130 is configured to extend through a tow hitch 212 coupled to a towing vehicle 210. Carrier 110 is configured to support and couple to various objects, such as vehicles and/or storage units, such as boxes, for transportation. In particular, carrier 110 is configured to couple to two-wheeled vehicles 112, such as bicycles and/or motorcycles.

Referring to FIG. 2, various aspects of carrier 110 are shown. Tow hitch 212 is coupled to vehicle 210, such as rigidly coupled. As will be explained, carrier 110 is coupled to tow hitch 212, such as rigidly coupled. Two-wheeled vehicle 112 is coupled to support platform 120, such as rigidly coupled. Support platform 120 is coupled to primary support arm 130, such as rigidly coupled. In various embodiments, support platform 120 is integrally molded with primary support arm 130 when carrier 110 is manufactured. In various embodiments, support platform 120 is welded to primary support arm 130 when carrier 110 is manufactured. In various embodiments, support platform 120 is configured to couple to and support one or more two-wheeled vehicles 112, and support platform 120 is coupled to second end 136 of primary support arm 130.

Figure 3:
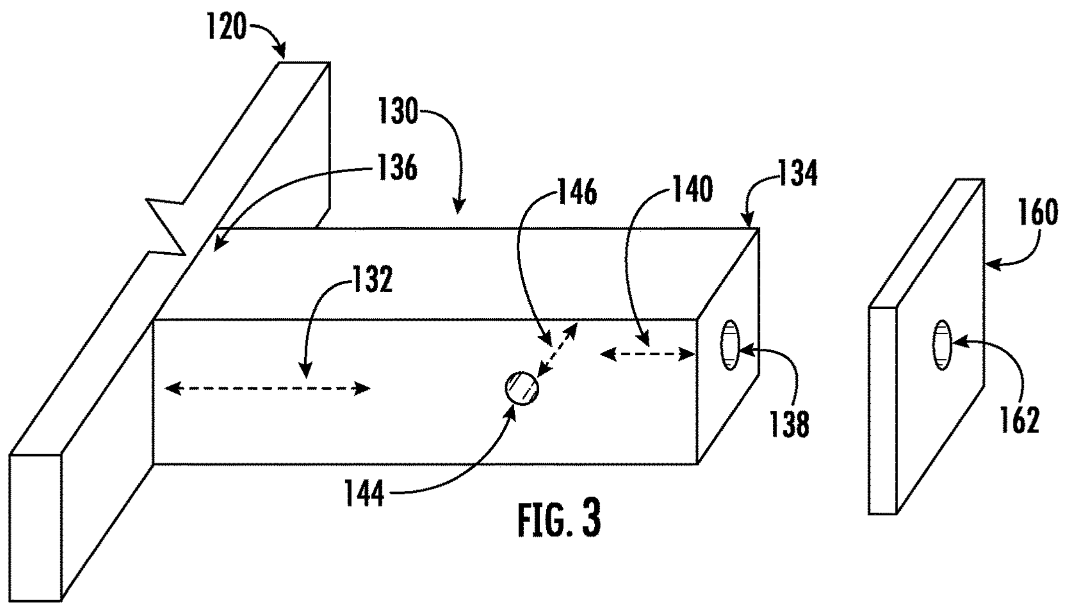
FIG. 3 is a perspective view of a portion of the carrier of FIG. 1, according to an exemplary embodiment.
Figure 4:
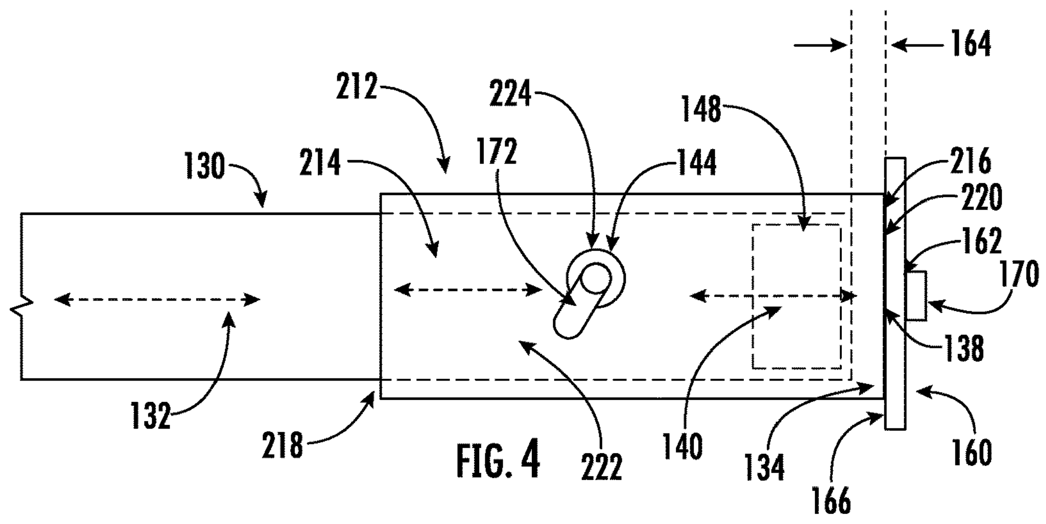
FIG. 4 is a side view of a portion of the carrier of FIG. 1, according to an exemplary embodiment.
Figure 5:
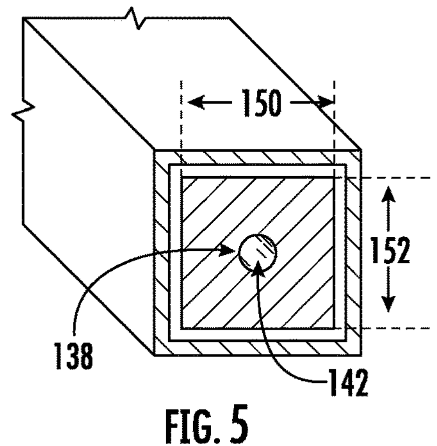
FIG. 5 is a perspective view from behind of a portion of the carrier of FIG. 1, according to an exemplary embodiment.

Referring to FIGS. 3-5, various aspects of carrier 110 are shown. Primary support arm 130 extends along first primary longitudinal axis 132 from first end 134 of primary support arm 130 to second end 136 of primary support arm 130. Primary support arm 130 defines a first cavity 138 at first end 134. In various embodiments, first cavity 138 extends along axis 140 and first cavity 138 includes threading 142 extending inward towards axis 140. In various embodiments, primary support arm 130 includes block 148 coupled to first end 134 of primary support arm 130, and block 148 defines first cavity 138. In various embodiments, block 148 is integrally molded with the first end 134 of the primary support arm 130.

Primary support arm 130 defines second cavity 144 partway between first end 134 and second end 136. In various embodiments, second cavity 144 extends along axis 146. Stated another way, primary support arm 130 defines second cavity 144 extending along third primary longitudinal axis 146 perpendicular to each of first primary longitudinal axis 132 and second primary longitudinal axis 140. Second cavity 144 is configured to receive hitch pin 172.

In various embodiments, carrier 110 includes hitch pin 172 configured to extend through second cavity 144. In various embodiments, hitch pin 172 interfaces against the tow hitch 212 to bias the primary support arm 130 away from the first end 216 of the tow hitch 212.

Tow hitch 212 extends along axis 214 from first end 216 to second end 218. Coupling plate 160 includes first aperture 162. In various embodiments, first aperture receives a fastener, shown as fastener 170, to couple coupling plate 160 to primary support arm 130 such that rear surface 166 of coupling plate 160 interfaces against surface 220 of first end 216 of tow hitch 212. Stated another way, fastener 170 extends through first aperture 162 of coupling plate 160 and into first cavity 138, fastener 170 threadably engaging the first cavity 138, and the engagement between the fastener 170 and the primary support arm 130 biasing the coupling plate 160 against the first end 216 of the tow hitch 212. In use, coupling plate 160 is a first non-zero distance (e.g., 0.1 inches) from the primary support arm 130 when the fastener 170 is threadably engaged with the first cavity 138 thereby rigidly coupling the coupling plate 160 against the tow hitch 212. Tow hitch 212 includes aperture 224 configured to receive hitch pin 172.

In various embodiments, axis 132 of primary support arm 130 and axis 140 of first cavity 138 are parallel, and more specifically are colinear. Stated another way, in various embodiments primary support arm 130 defines first cavity 138 at first end 134 extending along a second primary longitudinal axis 140 parallel to the first primary longitudinal axis 132. In various embodiments, axis 214 of tow hitch 212 is parallel to, and more specifically colinear with, one or both of axis 132 of primary support arm 130 and axis 140 of first cavity 138. In various embodiments, axis 146 is perpendicular to one or more of axis 132, axis 140, and axis 214.

In various embodiments, primary support arm 130 defines a horizontal diameter 150 parallel to axis 146 and perpendicular to axis 132. In various embodiments, primary support arm 130 defines a vertical diameter 152 perpendicular to each of axis 132 and axis 146.

In various embodiments, horizontal diameter 150 is between 1.4 inches and 1.6 inches, and more specifically between 1.45 inches and 1.55 inches. In various embodiments, vertical diameter 152 is between 1.4 inches and 1.6 inches, and more specifically between 1.45 inches and 1.55 inches.

In various embodiments, primary support arm 130 at the first end 134 defines a horizontal diameter 150 parallel to the third primary longitudinal axis 146, and the horizontal diameter 150 is between 1.4 inches and 1.6 inches. In various embodiments, primary support arm 130 at the first end 134 defines a vertical diameter 152 perpendicular to each of the first primary longitudinal axis 132, the second primary longitudinal axis 140, and the third primary longitudinal axis 146, and the vertical diameter 152 is between 1.4 inches and 1.6 inches.

Referring to FIG. 7, carrier 310 is shown according to an exemplary embodiment. Carrier 310 is substantially the same as carrier 110 except for the differences discussed herein. In particular, primary support arm 330 does not include a block coupled to first end 334 of primary support arm 330. Instead, primary support arm 330 is a substantially or fully solid unit that defines cavity 338. Coupling plate 160 couples to primary support arm 330 via fastener 170, and hitch pin 172 couples primary support arm 130 to tow hitch 212.

An exemplary method of using carrier 110 with a vehicle 210 is described. Primary support arm 130 is slid through tow hitch 212. Hitch pin 172 is extended through second cavity 144 and a first aperture 224 in the tow hitch 212. Fastener 170 is extended through a first aperture 162 of coupling plate 160 and into the first cavity 138, the fastener 170 and the first cavity 138 threadably engaging such that the coupling plate 160 is biased against the tow hitch 212. One or more two-wheeled vehicles 112 (e.g., bicycles) are secured to support platform 120 coupled to the second end 136 of the primary support arm 130.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A carrier for motorcycles, bicycles, storage racks or storage boxes for detachably coupling to a vehicle, the carrier comprising:

- a primary support arm configured to extend through a tow hitch coupled to a towing vehicle, the primary support arm extending along a first primary longitudinal axis from a first end to a second end, the primary support arm defining a first cavity at the first end extending along a second primary longitudinal axis parallel to the first primary longitudinal axis, the first cavity includes threading extending inward, the primary support arm defining a second cavity extending along a third primary longitudinal axis perpendicular to each of the first primary longitudinal axis and the second primary longitudinal axis;
- a coupling plate defining a first aperture, the coupling plate interfacing against a first surface at a first end of the tow hitch, wherein the first surface is perpendicular to the first primary longitudinal axis;
- a fastener extending through the first aperture and into the first cavity, the fastener threadably engaging the threading in the first cavity, the engagement between the fastener and the primary support arm biasing the coupling plate against the first end of the tow hitch; and
- a support platform configured to couple and support to one or more two-wheeled vehicles, the support platform coupled to the second end of the primary support arm.

2. The carrier of claim 1, the primary support arm comprising a block coupled to the first end of the primary support arm, the block defining the first cavity.

3. The carrier of claim 1, the primary support arm comprising a block integrally molded with the first end of the primary support arm, the block defining the first cavity.

4. The carrier of claim 1, comprising a hitch pin configured to extend through the second cavity.

5. The carrier of claim 4, wherein the hitch pin interfaces against the tow hitch to bias the primary support arm away from the first end of the tow hitch the second end.

6. The carrier of claim 5, wherein the first primary longitudinal axis is colinear with the second primary longitudinal axis.

7. The carrier of claim 1, wherein the first primary longitudinal axis is colinear with the second primary longitudinal axis.

8. The carrier of claim 1, wherein the coupling plate is a first non-zero distance from the primary support arm when the fastener is threadably engaged with the first cavity thereby rigidly coupling the coupling plate against the tow hitch.

9. The carrier of claim 1, wherein the primary support arm at the first end defines a horizontal diameter parallel to the third primary longitudinal axis, and wherein the horizontal diameter is between 1.4 inches and 1.6 inches.

10. The carrier of claim 9, wherein the primary support arm at the first end defines a vertical diameter perpendicular to each of the first primary longitudinal axis, the second primary longitudinal axis, and the third primary longitudinal axis, and wherein the vertical diameter is between 1.4 inches and 1.6 inches.

11. A carrier for detachably coupling to a vehicle, the carrier comprising:

a primary support arm configured to extend through a tow hitch coupled to a towing vehicle, the primary support arm extending along a first primary longitudinal axis from a first end to a second end, the primary support arm defining a first cavity at the first end extending along a second primary longitudinal axis parallel to the first primary longitudinal axis, the first cavity defining threading extending inward, the primary support arm defining a second cavity extending along a third primary longitudinal axis perpendicular to each of the first primary longitudinal axis and the second primary longitudinal axis;

a hitch pin extending through the second cavity and a first aperture in the tow hitch;

a coupling plate defining a second aperture, wherein the coupling plate extends normal to the first primary longitudinal axis;

a fastener extending through the second aperture, the fastener engaging the primary support arm, the engagement between the fastener and the primary support arm biasing the coupling plate against the tow hitch; and a support platform configured to couple and support to one or more two-wheeled vehicles, the support platform coupled to the second end of the primary support arm.

12. The carrier of claim 11, wherein the first primary longitudinal axis is colinear with the second primary longitudinal axis, wherein the engagement between the fastener and the primary support arm biases a first surface of the coupling plate against the tow hitch, wherein the first surface is perpendicular to the first primary longitudinal axis.

13. The carrier of claim 12, wherein the coupling plate is separated from the primary support arm a first distance when the fastener is engaged with the primary support arm thereby rigidly coupling the coupling plate against the tow hitch.

14. The carrier of claim 11, wherein the primary support arm at the first end defines a horizontal diameter parallel to the third primary longitudinal axis, and wherein the horizontal diameter is between 1.45 inches and 1.55 inches.

15. The carrier of claim 14, wherein the primary support arm at the first end defines a vertical diameter perpendicular to each of the first primary longitudinal axis, the second primary longitudinal axis, and the third primary longitudinal axis, and wherein the vertical diameter is between 1.45 inches and 1.55 inches.

16. A method of using a carrier with a vehicle comprising:

sliding a primary support arm through a tow hitch, the primary support arm extending along a first primary longitudinal axis from a first end to a second end, the primary support arm defining a first cavity at the first end extending along a second primary longitudinal axis parallel to the first primary longitudinal axis, the first cavity defining threading, the primary support arm defining a second cavity extending along a third primary longitudinal axis perpendicular to each of the first primary longitudinal axis and the second primary longitudinal axis;

extending a hitch pin through the second cavity and a first aperture in the tow hitch;

extending a fastener through a first aperture of a coupling plate and into the first cavity, the fastener and the threading in the first cavity threadably engaging such that the coupling plate is biased against the tow hitch, wherein the coupling plate extends normal to the first primary longitudinal axis; and securing one or more two-wheeled vehicles to a support platform coupled to the second end of the primary support arm.

17. The method of claim 16, wherein the first primary longitudinal axis is colinear with the second primary longitudinal axis, wherein the engagement between the fastener and the primary support arm biases a first surface of the coupling plate against the tow hitch, wherein the first surface is perpendicular to the first primary longitudinal axis.

18. The method of claim 16, wherein the coupling plate is separated from the primary support arm a first distance when the fastener is engaged with the primary support arm thereby rigidly coupling the coupling plate against the tow hitch.

19. The method of claim 16, wherein the primary support arm at the first end defines a horizontal diameter parallel to the third primary longitudinal axis, and wherein the horizontal diameter is 1.5 inches.

20. The method of claim 19, wherein the primary support arm at the first end defines a vertical diameter perpendicular to each of the first primary longitudinal axis, the second primary longitudinal axis, and the third primary longitudinal axis, and wherein the vertical diameter is 1.5 inches.

* * * * *